Sept. 16, 1947.  W. H. DE LANCEY  2,427,551
LIQUID MEASURING AND DISPENSING APPARATUS
Filed Nov. 2, 1944  6 Sheets-Sheet 6

INVENTOR
WARREN H. DE LANCEY
BY Chapin & Neal
ATTORNEYS

Patented Sept. 16, 1947

2,427,551

UNITED STATES PATENT OFFICE 2,427,551

LIQUID MEASURING AND DISPENSING APPARATUS

Warren H. De Lancey, Springfield, Mass., assignor to Gilbert & Barker Manufacturing Company, West Springfield, Mass., a corporation of Massachusetts Application November 2, 1944, Serial No. 561,517

15 Claims. (Cl. 222—72)

This invention relates to improvements in liquid measuring and dispensing apparatus, such for example as that class used for dispensing measured quantities of gasoline at service stations.

The invention has for its general object the provision in a liquid dispensing apparatus of a liquid-dispensing pump of the variable-capacity type so arranged as to operate at a maximum rate, when the valve of the hose nozzle is fully opened, and to have its capacity reduced by the rise in pressure of the liquid in the discharge conduit, as the nozzle valve is moved toward and to closed position, whereby the pump works at a variable rate according to the need and, when the nozzle valve is closed, works at a very low rate just sufficient to compensate for slippage in the pump and with substantial economies in consumption of power, instead of working at a high rate to pump liquid through a by-pass under heavy pressure as in the common form of pumping arrangement now in general use.

The invention has for another object the provision in liquid dispensing apparatus of the class described, of a chamber in which separation of air and/or gases from the liquid can be effected under the favorable condition of partial vacuum, and two variable-capacity pumps, one for scavenging and one for dispensing air-free liquid, both connected to the chamber with an arrangement whereby air or gases are prevented from entering the liquid-dispensing pump—the latter having means responsive to rising pressure on closure of the nozzle valve to reduce its pumping rate to a minimum and the scavenging pump being responsive to a pressure rise due to the presence of liquid in its outlet port but not to the presence of air or gases, to reduce its capacity to a minimum.

The invention has for a further object the provision of an air separator with upper and lower outlets and an inlet, of two variable-capacity pumps having their suction sides connected one with the upper and one with the lower outlet, and a discharge conduit in which a meter and the pump connected with the lower outlet are interposed, together with means for varying the capacity of the last-named pump from a maximum when the outlet of said conduit is open to a minimum when said outlet is closed, and means for varying the capacity of the other pump from a maximum when air or gases only are being pumped to a minimum when liquid only is being pumped.

The invention will be disclosed with reference to the accompanying drawings, in which.

Figure 1:
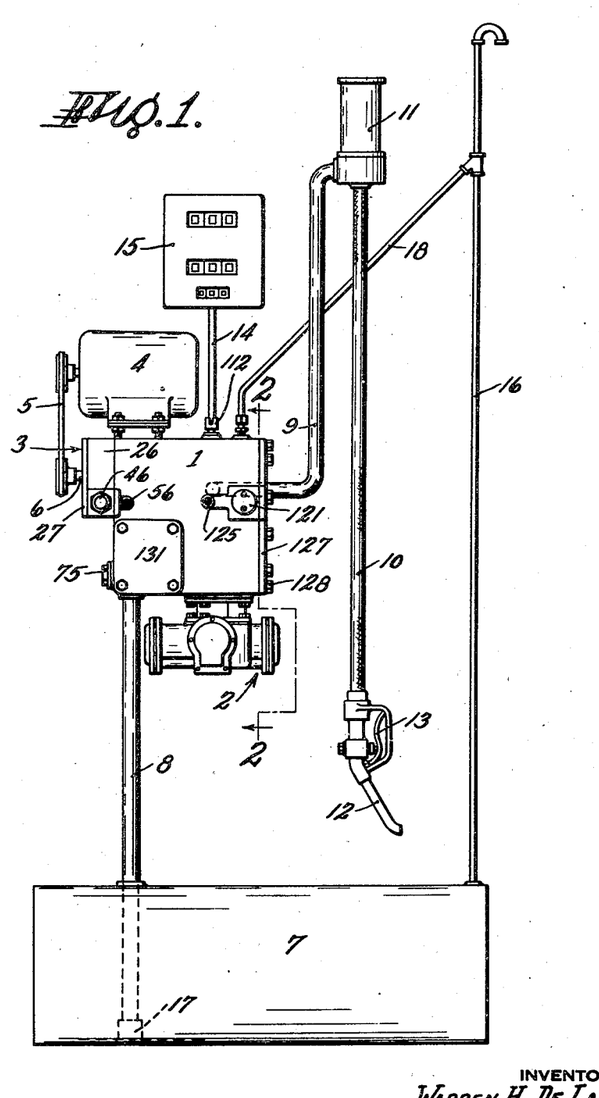
Fig. 1 is a small scale diagrammatical view of a liquid measuring and dispensing apparatus embodying the invention.
Figure 2:
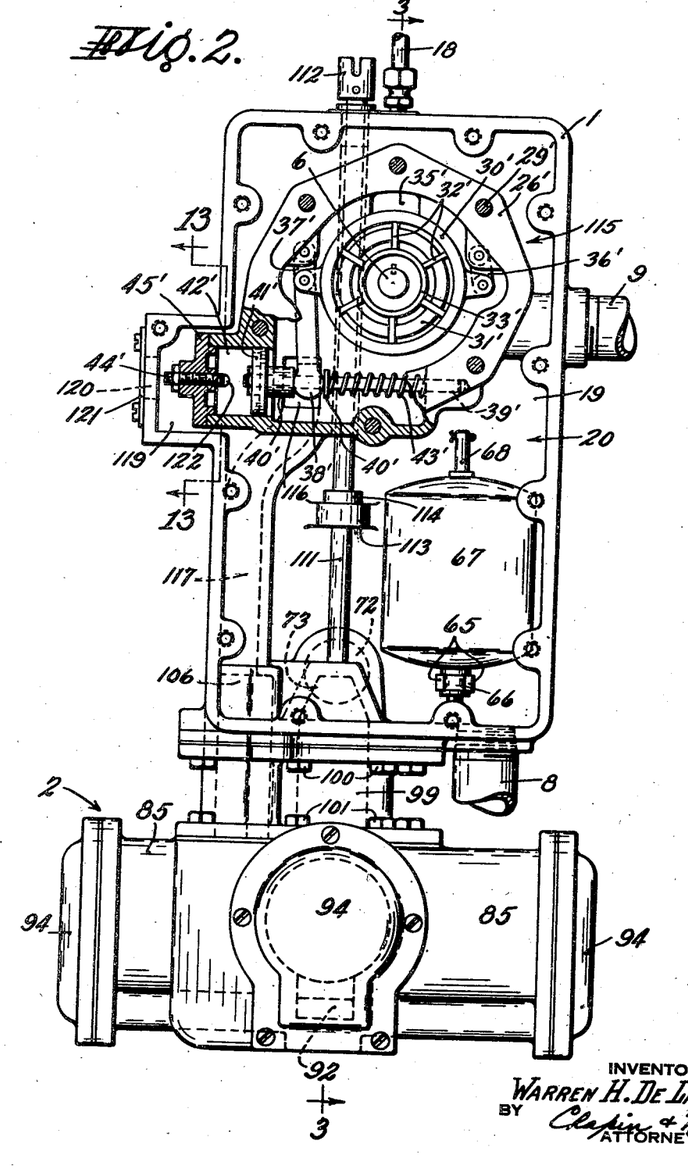
Fig. 2 is a sectional view, taken on the line 2—2 of Fig. 1 and drawn to a larger scale, showing the liquid dispensing pump, the meter and the secondary separator.

Referring to these drawings and first to Fig. 1, the apparatus includes a casing 1 which contains primary and secondary air separators, a gasoline dispensing pump, and accessories. Fixed to the bottom of this casing is a meter 2. Fixed to one end of the casing is a scavenging pump 3 for the primary separator. Fixed to the top of the casing is a motor 4 which drives by a belt 5 a shaft 6 for actuating both pumps. Gasoline is drawn up from a low level supply tank 7 through a suction pipe 8 into the primary separator. Air-free liquid from the latter is drawn into meter 2 by the dispensing pump and forced into the discharge conduit, comprising fixed piping 9 and a flexible hose 10 with an optionally interposed visible discharge indicator 11 of any suitable type. The hose terminates with the usual nozzle 12 containing a self-closing valve which may be manually opened by the lever 13. The meter 2 is connected by means including the shaft 14 to operate a register 15 of any suitable form. As herein indicated, the register is of the so-called computer type which indicates the cost as well as the quantity of the liquid dispensed. The supply tank 7 has the usual vent pipe 16 and its suction pipe 8 is provided with the usual foot valve 17.

A vent pipe 18 for the secondary separator or liquid-recovery chamber is connected to the vent pipe 16.

Figure 3:
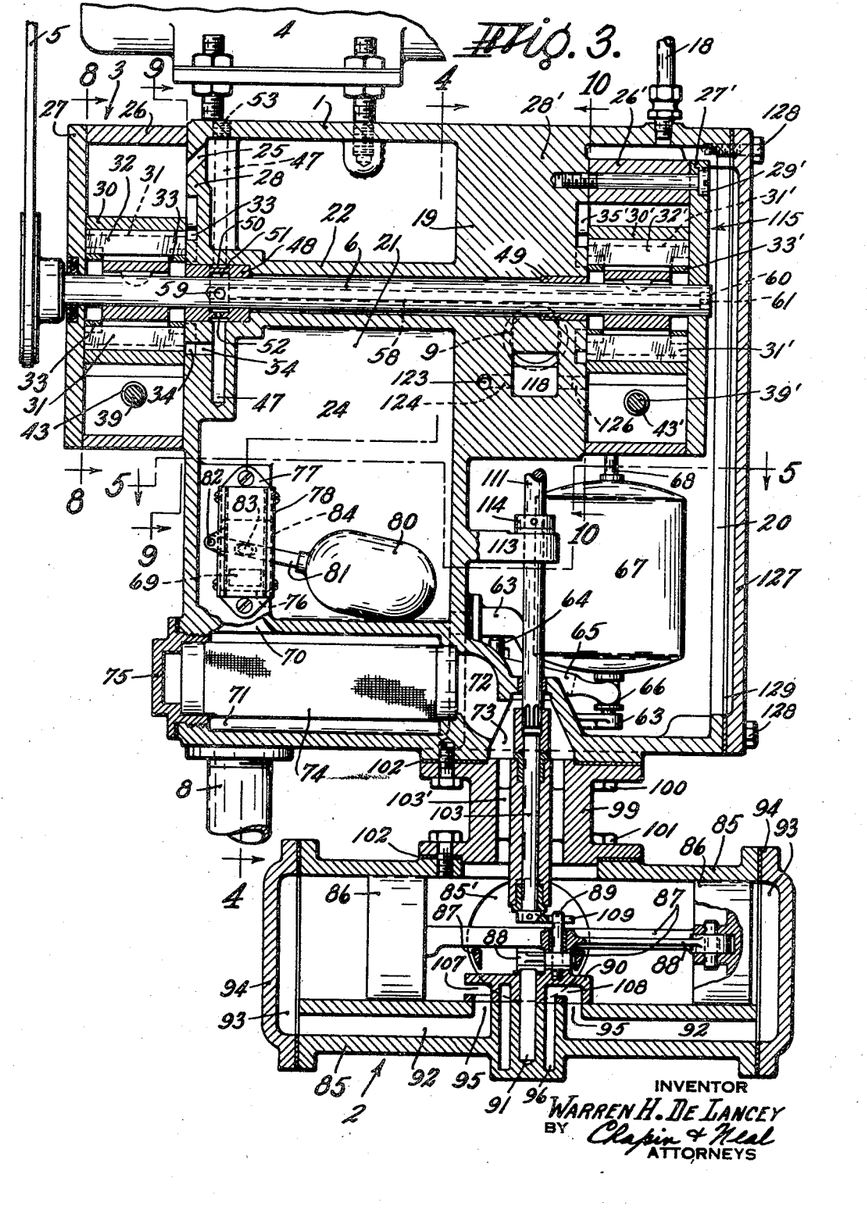
Fig. 3 is a sectional view taken on the line 3—3 of Fig. 2 and showing the primary and secondary separators, the liquid dispensing pump, the scavenging pump and the meter.
Figures 4, 12, 13, 14:
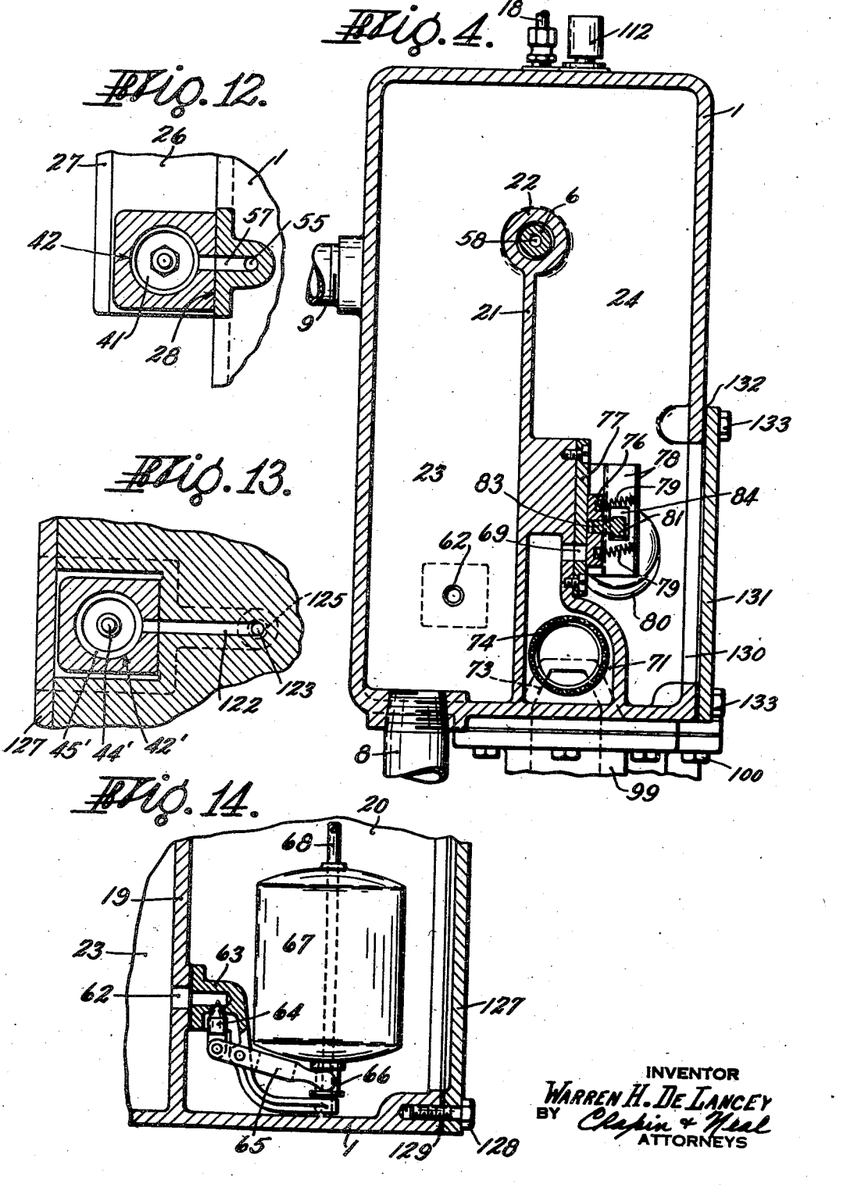
Fig. 4 is a cross sectional view taken on the line 4—4 of Fig. 3 and showing the primary separator.
Fig. 12 is a sectional view taken on the line 12—12 of Fig. 8.
Fig. 13 is a sectional view taken on the line 13—13 of Fig. 2.
Fig. 14 is a sectional view taken on the line 14—14 of Fig. 5.
Figures 5, 6, 7:
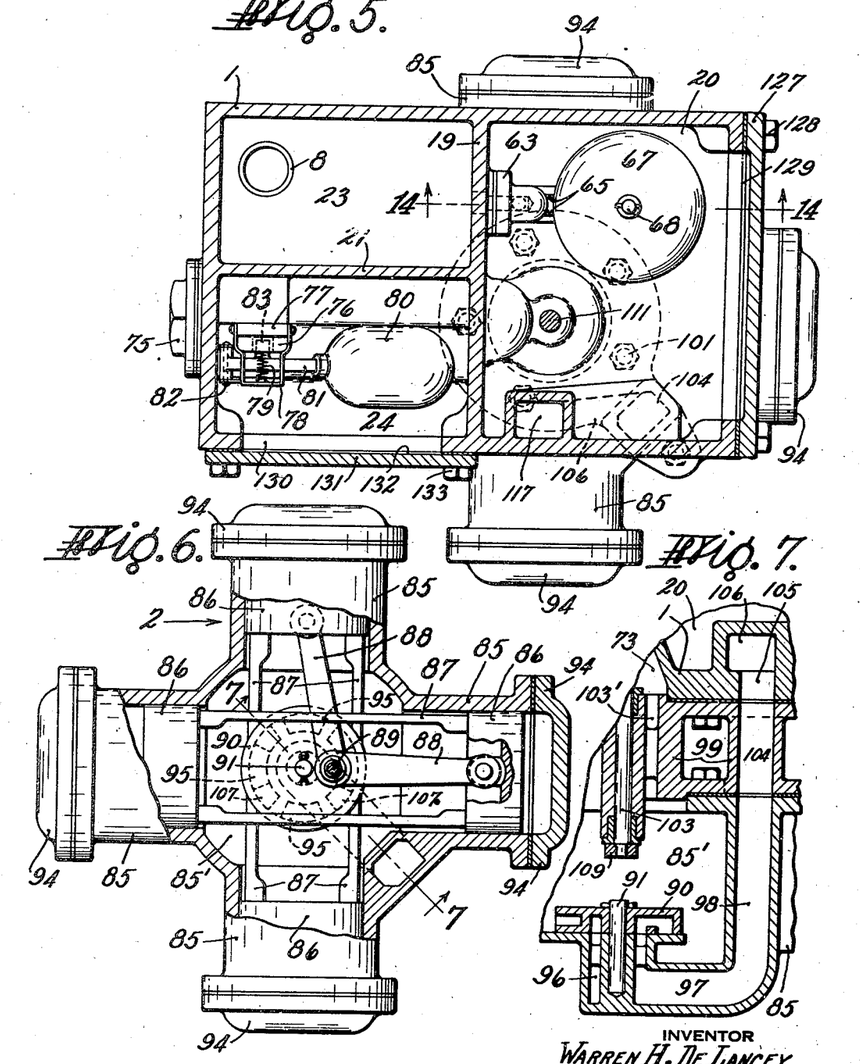
Fig. 5 is a sectional plan view taken on the line 5—5 of Fig. 3.
Fig. 6 is a sectional plan view of the meter.
Fig. 7 is a fragmentary sectional view taken on the line 7—7 of Fig. 6.

Referring next to Figs. 3 and 5, the casing 1 is divided by a transverse partition 19 which extends from top to bottom thereof. The chamber 20 at the right of partition 19 is the secondary separator or liquid-recovery chamber. The space to the left of partition 19 (Fig. 5) is subdivided by a partition 21 which as shown in Fig. 4 extends from the bottom of casing 1 upwardly toward but terminates short of the top and with a hollow cylindrical portion 22. This partition 21 forms a dam. On one side of the dam is the inlet chamber 23 to which suction pipe 8 is connected. On the other side is the primary separating chamber 24. Gasoline entering chamber 23 from pipe 8 passes upwardly and flows over the crest 22 of the dam 21 falling into chamber 24 and eventually filling the same.

Figures 8, 9, 10, 11:
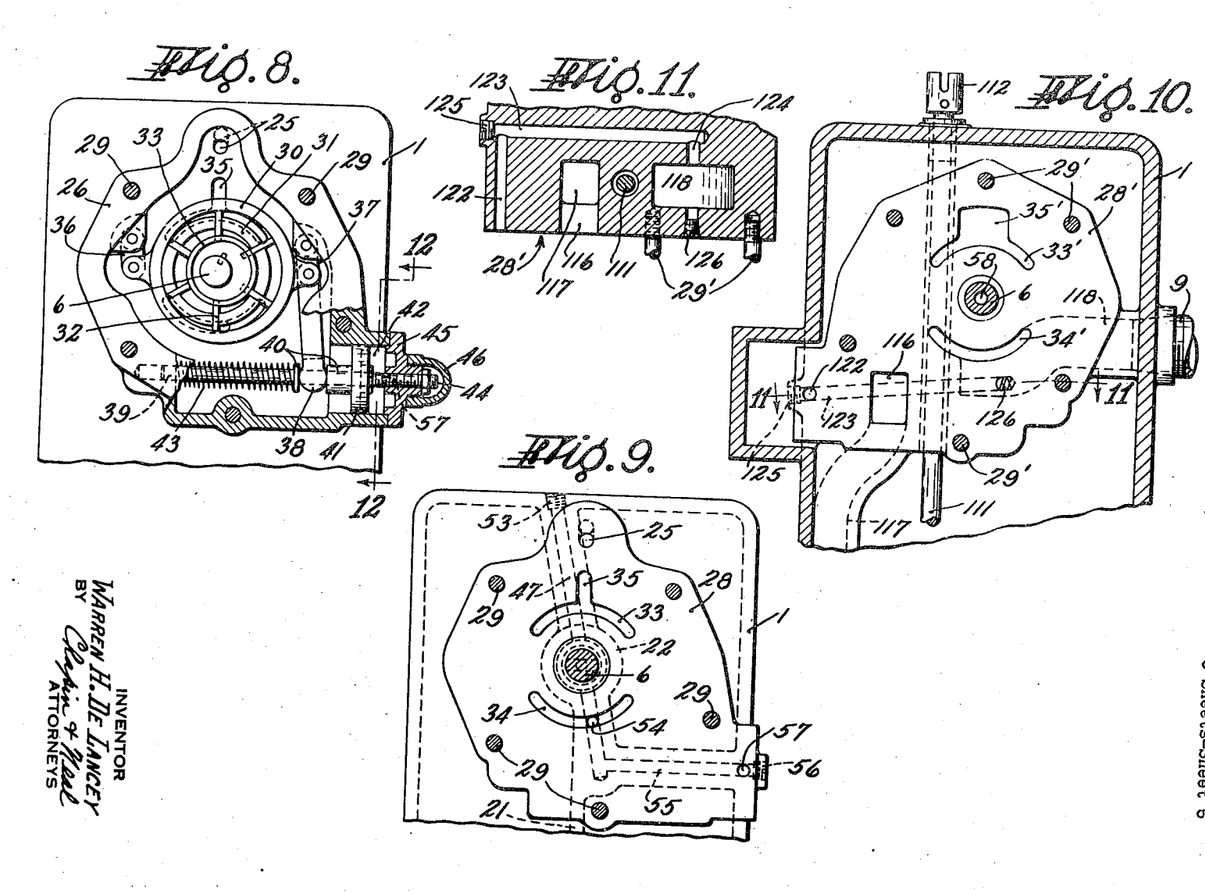
Figs. 8, 9 and 10 are fragmentary sectional views taken on the lines 8—8, 9—9 and 10—10, respectively, of Fig. 3.
Fig. 11 is a sectional view taken on the line 11—11 of Fig. 10.

The scavenging pump 3 is connected to the top of the separating chamber 24 by means of a passage 25 (Figs. 3 and 8). This pump is of the positively-acting, variable-capacity type. It includes a hollow outer casing 26 with front and rear closure walls 27 and 28, respectively. The rear wall 28 consists of a finished pad formed on and integrally with one end wall of casing 1 (Fig. 9). The several casing parts are held together by a plurality of cap screws 29, which pass through the front wall or cover 27 and through casing 26 and thread into wall 28. The passage 25 connects with an outer portion of the space within the pump casing. Mounted within the central portion of this space is the pump proper which consists of a cylindrical stator 30 and a cylindrical rotor 31 fixed to shaft 6. This rotor is slotted to receive a series as six, of radially slidable blades 32. Each end face of rotor 31 is recessed to receive an annular ring 33. The two rings serve to hold the blades 32 in contact with the inner peripheral surface of stator 30. The rotor, stator and blades are substantially equal in length to the casing 26 and slide freely over the finished inner surfaces of walls 27 and 28 (Fig. 3). The inlet and outlet ports 33 and 34, respectively (Fig. 9), are formed by arcuate grooves in the back wall 28. The inlet port 33 is connected by a radial groove 35 in wall 28 to the space outside rotor 30 and thus communicates with passage 25, above described.

The rotor 30 (Fig. 8) of the pump is suspended by links 36 and 37 from and within the outer casing. Link 37 has a downward extension terminating in a fork 38 to straddle a rod 39 and lie between and engage two collars 40 on this rod. This rod is fixed at one end to a piston 41, slidable in a cylinder 42 formed in casing member 26. The other end of rod 41 is slidably guided in the member 26. A spring 43 encompasses rod 41 and tends to move the piston 42 to the right and against an adjustable stop 44 mounted in the head 45 of cylinder 42. A screw cap 46 covers and conceals the outer end of this stop screw 44. The spring 43 tends to hold the pump stator in the illustrated position of maximum pumping capacity. Pressure on piston 41 will shift the stator to the left to decrease said eccentricity and capacity. When the rotor and stator are shifted into coaxial relation, the pump will have zero capacity and will do no work.

The outlet port of the scavenging pump is connected both to the cylinder 42 and to the liquid-recovery chamber 20. A hole 47 (Figs. 3 and 9) is drilled from the top downwardly through wall 28 to a level slightly below the axis of cylinder 42. This hole is located diametrically of shaft 6. This shaft (Fig. 3) is mounted in bearings 48 and 49, fixed one in wall 28 and one in partition 19, and passes through the hollow crest portion 22 of the dam 21. The bearing 48 has intermediate its ends external and internal annular grooves 50 and 51, respectively, interconnected by one or more radial holes 52. The upper end of hole 47 is closed by a plug 53. A hole 54 (Figs. 3 and 9) is drilled from outlet port 34 to hole 47. A hole 55 (Fig. 9) drilled horizontally through wall 28 and intersects the lower end of hole 47. The outer end of hole 55 is closed by a plug 56. A hole 57 (Figs. 9 and 12) interconnects hole 55 and cylinder 42. The latter is thus connected through holes 57, 55, 47 and 54 to the outlet port 34 of the scavenging pump. The shaft 6 (Fig. 3) has an axial passage 58 extending from its right hand end which lies in the upper part of chamber 20 to a point slightly beyond the middle of bearing 48 where it is connected by a diametrical hole 59 to the annular groove 51. The right hand end of passage 58 contains a plug 60 having a restricted bore 61 therethrough. The fluid pumped by the scavenging pump can thus pass from the outlet port 34 to the upper part of chamber 20 by way of holes 54, and 47, annular groove 50, holes 52, annular groove 51, hole 59, passage 59 and restricted bore 61. The area of the latter is such that it will readily pass all the air that pump 3 can pump when working at maximum capacity. However, after the necessary scavenging of air has taken place and liquid reaches bore 61, a back pressure will be established which acts on piston 41 and shifts the pump stator to decrease the pumping capacity as far as may be necessary and even to zero if and when required.

The fluids delivered into chamber 20 are gravitationally separated therein in the usual and well known way—the air passing off through vent pipes 18 and 16 and the liquid passing to the lower part of the chamber. The liquid accumulating in chamber 20 is returned to the inlet chamber 23 (Fig. 14) through a passage 62, formed in part in partition 19 and in part in a bracket 63 secured to this partition. A valve 64 is pivotally supported on one end of a lever 65, which is fulcrumed intermediate its ends on bracket 63. The other end of lever 65 is forked to engage a clutch collar 66 fixed to the lower end of a float 67, which is slidably mounted on a vertical rod 68, the lower end of the latter being fixed to bracket 63. When liquid rises in chamber 20 to a predetermined level the float 67 will rise and open valve 64, allowing the liquid to be drawn by the suction of the scavenging pump 3 and/or the liquid dispensing pump to be later described, into the inlet chamber 23. When the level of liquid falls to or below said level valve 64 will close.

The primary separating chamber 24 has a second outlet near the bottom thereof through which air-free liquid passes to the meter 2. This outlet includes a port 69 (Fig. 4) for interconnecting chamber 24 to a vertical passage 70 which is cored in the lower part of the partition 21. Passage 70 opens into a horizontal passage 71 cored in the bottom wall of the casing 1 and communicating at one end with an elbow passage 72 also cored in the bottom wall of casing 1. Passage 72 leads into a conical passage 73 which opens through the bottom wall of chamber 20 into the inlet of the meter 2. A screen 74 extends through the passage 71, having one end seated in the entrance end of elbow passage 72 and the other in a nut 75 threaded into the outer end of passage 71.

The inlet port 69 is opened and closed by a valve 76 in response to rise and fall of liquid in chamber 24. The valve 76 is of carbon and is vertically slidable over a seat 77 fixed as indicated to a wall of passage 70. Fixed to the sides of seat 77 (Fig. 5) is a substantially U-shaped metal frame 78 which serves as a guide for the valve. Springs 79, each having one end encompassing a stud on the guide and the other end inserted into a hole in the valve, serve to hold the valve to its seat. A float 80 is mounted on one end of a lever 81 which is pivoted at 82 to guide 78 and has a projection 83 engaged in a hole in the valve. The sides of guide 78 are appropriately slotted as indicated in Fig. 4, to permit the necessary swinging movement of lever 81. As shown, the float is in its lower position, wherein lever 81 engages the bottom wall of slot 84 and the port 69 is closed by the valve 76. When liquid rises in chamber 24 to a level above port 69, valve 76 will open this port and allow liquid to enter passages 70 and 71 and, passing through screen 74, to enter the passages 72 and 73 and the meter.

The meter may be of any suitable type. As shown in Fig. 6 by way of illustrative example, it is of the positive-displacement type having a plurality of radial cylinders 85 radiating from a central chamber 85'. Pistons 86, one in each cylinder, are interconnected in opposed pairs by pairs of bars 87. The two pairs of bars are at different levels to avoid interference (see also Fig. 3), and one piston of each pair is connected by a rod 88 to a crankpin 89, fixed eccentrically to the top of a valve 90. The latter is rotatably mounted on a stud 91 fixed in the bottom wall of chamber 85'. Cored in the bottom walls of the cylinders are longitudinal passages 92, one for each cylinder, each leading from the clearance space 93 in a cylinder head 94 to a port 95 in the bottom wall of chamber 85'. Surrounding the stud 91 is a central and more or less annular discharge passage 96 which empties into a radial passage 97 and a communicating vertical passage 98, all such passages being cored in the body of the meter. The meter body is secured to the bottom of the casing 1 by means of a flanged coupling 99 and cap screws 101 and 102, respectively passing through the upper and lower flanges of the coupling and threading into the bottom wall of casing 1 and the top wall of meter 2. Gaskets 102 seal the joints and render the connection liquid tight. This coupling 99 has a central bearing for a shaft 103 and around this bearing are passages 103' which connect the conical chamber 73, above described, to the inlet chamber 85'. The coupling 99 also has a vertical passage 104 (Fig. 7) which connects the meter outlet passage 98 to a port 105 and a communicating horizontal passage 106, both formed in the bottom wall of chamber 20.

The valve 90 has suitable ports, such as an inlet port 107 (Fig. 6), for connecting the inlet chamber 85' to a port 95 for one cylinder 85, and an outlet port 108 for connecting at the same time the port 95 of the opposed cylinder 85 to the discharge passage 96. The liquid entering chamber 85' is distributed successively to the cylinders 85 to so move the pistons 86 as to rotate the valve 90 continuously in one direction. The movement of the pistons is made to actuate the shaft 103 by means of a crank 109 fixed to the lower end of this shaft and having a forked end to receive the crankpin 89. The shaft 103 has fixed to its upper end a coupling 110, which lies within the chamber 93. Engaged with this coupling is a shaft 111 which extends vertically upward through the chamber 20 and through the top wall thereof and has fixed to its upper end a coupling 112 to connect with the register driving shaft 14 above described. Shaft 111 is supported in suitable bearings, one in the top wall of chamber 73, one in a lug 113 on partition 19 and one in the top wall of chamber 20. A collar 114 on shaft 111 engages the upper end face of the bearing in lug 113 to take care of the end thrust.

In the upper part of the chamber 20 is mounted the liquid dispensing pump, designated generally as 115. This pump is also a positively-acting variable-capacity pump and may be, and is as herein shown, constructed in the same manner as the scavenging pump. Parts of the liquid-dispensing pump which correspond with parts of the scavenging pump have been given the same reference numerals with the addition of a prime. The back wall 28' in this case is formed as an integral part of the partition 19. Gasoline enters the interior of casing 26' at a location outside that area which is covered by the stator throughout its range of movement, through a port 116 (Figs. 10 and 11) formed in wall 28'. This port connects with the upper end of a cored passage 117, formed in one side wall of chamber 20 and extending downwardly to and connecting with the passage 106, heretofore described as connected to the outlet of the meter. The discharge port of the pump opens directly into one end of a cored passage 118 which at its other end is tapped to receive the described discharge pipe 9. The chamber 20 has a small lateral extension 119 to receive the outer end of the cylinder 42' and its head 45'. A hole 120 in the wall of this extension allows access to the adjustable abutment 44' when a cover 121 is removed. This cylinder 42' is connected to the outlet passage 118 of pump 115 by three passages 122, 123 and 124. The hole 122 extends rearwardly through the bottom wall of cylinder 42' and into a side wall of chamber 20. The hole 123 is drilled from said side wall into the back wall 28' at right angles to hole 122 and on a slight upward inclination so that it will meet and intersect the hole 124 which is drilled inwardly into wall 28' through passage 118. Plugs 125 and 126 close the outer ends of passage 123 and 124, respectively.

The pump 115 has been shown in its position of zero capacity. Actually, because of slippage in the pump, the pump will never quite reach this position when the nozzle is closed because it will continue to work at a very low rate sufficient to compensate for the slippage and maintain the necessary pressure in cylinder 42'.

To enable assembly of the pump 115, float valve 64 and associated parts, and the shaft 111 in the chamber 20, one wall of the latter is made as an easily removable cover 127 held in place by cap screws 128 and provided with a gasket 129 to make a liquid-tight joint.

To enable assembly of the float-actuated valve 76 and associated parts in the chamber 24, an opening 130 is provided in the lower portion of the outer side wall of the chamber. A cover 131 clamped to such wall with a gasket 132 therebetween by a series of cap screws 133, normally closing such opening in liquid-tight fashion.

The operation of the apparatus will next be described. Considering first the initial priming of the system from a condition where the suction pipe 8 and its extension—the inlet chamber 23—the primary separator 24, meter 2 and the discharge conduit 9, 10, are filled with air. The motor 4 is started up in the usual or any suitable way, thus rotating the rotors of the scavenging pump 3 and the liquid-dispensing pump 115. With no pressure available in the cylinders 42 or 42′, the stators of both pumps will be located in their positions of maximum pumping capacity. Since no liquid is present in the primary separator 24, valve 76 will be closed and the pumping action of pump 115 will be ineffective. The scavenging pump 3 will, however, work at maximum capacity and rapidly exhaust air from the suction pipe, inlet chamber 23 and separator 24, expelling the air into chamber 20, from which it passes off through vent pipes 18 and 16 to the atmosphere. As soon as gasoline rises in chamber 23 above the level of the crest 22 of the dam 21, it will overflow into chamber 24. The latter will be gradually filled with gasoline. As soon as gasoline rises sufficiently in chamber 24, valve 76 will open and the pump 115 will draw it into the meter. If now the valve or hose nozzle 12 is opened, pump 115 will expel the air ahead of the liquid which it draws from chamber 24. As soon as gasoline is emitted from nozzle 12, the nozzle valve will be closed. The continued operation of pump 115 will then cause a rise in pressure in the discharge conduit sufficient to overcome the force of spring 43′ and cause the stator 30′ to be shifted to its position of minimum capacity. The pump 115 will then work at a very low rate sufficient to take care of the slippage in the pump, until nozzle 12 is again opened. Meanwhile the scavenging pump 3 continues its operation until all the air is removed from the chambers 23 and 24 and the same become entirely filled with gasoline. After this happens and, when gasoline fills the scavenging pump and its several outlet passages up to the restricted bore 61, a pressure rise will occur in cylinder 42 and shift the stator of the scavenging pump to its position of minimum capacity. The system will now be completely primed and the motor 4 may be stopped until a dispensing operation of the apparatus is desired. Until the motor is stopped, the rotors of both pumps will continue to turn but without doing any substantial amount of work since they are held by liquid pressure in their positions of minimum pumping capacity.

It will be noted that the spring 43′ of the liquid dispensing pump 115 is much stronger than spring 43. This is necessary because the spring 43′ has to hold the stator of pump 115 in its position of maximum capacity against a normal dispensing pressure of around 15 pounds per square inch when the nozzle valve is opened and yields only when the pressure in the discharge conduit rises above the said normal pressure.

The normal dispensing operation is as follows: Initially both pumps will be in their positions of maximum pumping capacity. This follows because the pressure in the cylinder 42 of the pump 3 decreased rapidly to atmospheric after the motor 4 was stopped due to the constantly open connection with the chamber 20 which is vented to the atmosphere. The pressure in the cylinder 42′ of pump 115 likewise was dissipated after the motor 4 was stopped, because of leakage past the pump and the meter, into the chamber 24 through passage 25, and past the pump 3 and into vented chamber 20. On starting up motor 4, the pump 115 will first build up pressure in the discharge conduit to a point such that the stator of the pump will be shifted to its position of minimum capacity and the pump will continue to work at this low rate, which is sufficient to take care of the slippage in the pump, until the nozzle valve is opened. The pump 3 will work at its high rate until pressure is built up in its cylinder 42 to a point sufficient to shift its stator to its low rate position. If the separator is full, the requisite pressure will be built up almost immediately. If there is air to be scavenged from the separator 24, chamber 23 or suction pipe 8, the pump 3 will first do this work, and do it quickly because it is working at a high rate, and then the pump will be shifted to work at a low rate. Since the restricted bore 61 is always open pump 3 must work at a rate sufficient to maintain a small stream of gasoline through this bore. This rate will be the lowest rate at which the pump will work. Obviously, not much work is required to lift this small amount of liquid through a distance not much greater than half the height of the separator chamber 24. If air or gas is present in the gasoline, so as to require continual separation, then the pump 3 will work at a higher rate, varying with the amount of air or gas present. The pump 3 will operate at whatever rate is necessary to maintain the separator 24 full of gasoline.

After having started the motor 4, the operator carries the nozzle 12 to and inserts it in the tank to be serviced, opening the valve in the nozzle by means of lever 13. The ensuing drop in pressure in the discharge line will cause pump 115 to operate at a higher rate, which will be at a maximum when the nozzle valve is fully opened and less when the valve is not fully opened. Gasoline will be dispensed from the nozzle and the quantity and/or cost of the gasoline dispensed will be shown on the register 15. As soon as the desired amount of gasoline has been dispensed, the operator closes the nozzle valve and returns the nozzle to its original position and stops motor 4. Immediately on closing the nozzle valve, the pump 115 will be shifted to a position of very low capacity, just sufficient to take care of the slippage in the pump. Thus, in the interval between closing of the nozzle valve and stopping of the motor, the pump 115 does no substantial amount of work but works at the very low rate described without consuming much power.

The invention provides for pumping only when there is a need for it, whereby useless work is avoided as well as the unnecessary consumption of power in performing such work. The two pumps work alternately or jointly according to the need and the rate at which they work varies accordingly to the amount of work there is to do. Unnecessary work, such as occurs in the usual positively-acting liquid-dispensing pump, where a large volume of liquid is pumped around a bypass against heavy pressure following the closure of the nozzle valve, is eliminated. Only a very small stream of liquid sufficient to compensate for the slippage of the pump, is pumped by the apparatus of this invention under the same circumstances. Rapid scavenging is secured by the use of a large pump but power consumption is cut down by the arrangement whereby the large pump works only at a very low rate when scavenging is not needed. Both pumps are connected to the same chamber but while the scavenging pump can pump both air and liquid, the dispensing pump, in normal operation, is prevented from pumping anything but liquid, as by the float-controlled valve in the separator chamber. The invention also enables separation of air and/or gases from the gasoline under partial vacuum—a more favorable condition than that of heavy pressure which is the common condition when a positively-acting pump forces the liquid into and through the separator.

An improved liquid dispensing apparatus has thus been provided which accomplishes its work in a simpler, better and more efficient way, and which is economical in consumption of power.

I claim:

1. Liquid dispensing apparatus, comprising, a chamber having an inlet adapted for connection to a liquid supply tank and two outlets located one near the top and one near the bottom of the chamber, a first variable-capacity pump connected to the upper outlet, a discharge conduit for liquid connected to the lower outlet and including a control valve, a meter and a second pump interposed in said conduit, said second pump being positively-acting and of variable capacity means operable by pressure variations in said conduit to vary the capacity of the second pump from a minimum when the valve is closed to a maximum when said valve is fully open and vice versa, and means operable to vary the capacity of the first pump from a maximum when it is pumping air or gases to a minimum when liquid only is being pumped.

2. Liquid dispensing apparatus, comprising, a chamber having an inlet adapted for connection to a liquid supply tank and two outlets located one near the top and one near the bottom of the chamber, a first variable-capacity pump connected to the upper outlet, a discharge conduit for liquid connected to the lower outlet and including a control valve, a meter and a second variable-capacity pump interposed in said conduit, means operable by pressure variations in said conduit to vary the capacity of the second pump from a minimum when the valve is closed to a maximum when said valve is fully open and vice versa, means operable to vary the capacity of the first pump from a maximum when it is pumping air or gases to a minimum when liquid only is being pumped, and means for closing the lower outlet until liquid rises above it.

3. Liquid dispensing apparatus, comprising, an air separator having an inlet adapted for connection to a liquid supply tank, an outlet for air-free liquid near the bottom of the separator and a scavenging outlet near the top of the separator; a discharge conduit connected to the first-named outlet, a variable-capacity pump and a meter interposed in said conduit, a self-closing valve in said conduit near the outlet end thereof, means operable by pressure variations of the liquid in said conduit for varying the capacity of said pump from a maximum when said valve is fully open to a minimum when said valve is closed, a second variable-capacity pump connected to the second outlet of the separator and having in its outlet a constriction of an area such as to pass all the air which the pump can pass when working at maximum capacity but incapable of passing all the liquid which the pump can pass when working at minimum capacity, whereby a rise in pressure will occur in said outlet when liquid is discharged from the pump, and means operable by the variation in pressure in the outlet of the second pump to vary the capacity of the latter from a maximum when air is discharged through the outlet of the second pump to a minimum when only liquid is discharged from the last-named outlet.

4. Liquid-dispensing apparatus, comprising, a chamber having an inlet adapted for connection to a liquid supply tank and two outlets located one near the top and one near the bottom of the chamber, first and second variable-capacity pumps connected respectively to the upper and to the lower outlet, a meter interposed between the second pump and lower outlet, a discharge conduit for the second pump including a control valve, means operable by pressure in said conduit to vary the capacity of the second pump from a minimum when the valve is closed to a maximum when said valve is fully open and vice versa, and means operable to vary the capacity of the first pump from a maximum when it is pumping air or gases to a minimum when liquid only is being pumped.

5. Liquid dispensing apparatus, comprising, a chamber having an inlet adapted for connection to a liquid supply tank and two outlets located one near the top and one near the bottom of the chamber, first and second variable-capacity pumps connected respectively to the upper and to the lower outlet, a meter interposed between the second pump and lower outlet, a discharge conduit for the second pump including a control valve, means operable by pressure in said conduit to vary the capacity of the second pump from a minimum when the valve is closed to a maximum when said valve is fully open and vice versa, means operable to vary the capacity of the first pump from a maximum when it is pumping air or gases to a minimum when liquid only is being pumped, and means for closing the lower outlet until liquid rises a substantial distance above the bottom of said chamber.

6. Liquid dispensing apparatus, comprising, an air separator having an inlet adapted for connection to a liquid supply tank, an outlet for air-free liquid near the bottom of the separator and a scavenging outlet near the top of the separator; a meter having its inlet connected to the first-named outlet, a variable-capacity pump having its inlet connected to the outlet of the meter, a discharge conduit connected to the outlet of said pump, a self-closing valve in said conduit, means operable by pressure of the liquid in said conduit for varying the capacity of said pump from a maximum when said valve is fully open to a minimum when said valve is closed, a second variable-capacity pump connected to the second outlet of the separator and having in its outlet a constriction of an area such as to pass all the air which the pump can pass when working at maximum capacity but incapable of passing all the liquid which the pump can pass when working at minimum capacity, whereby a rise in pressure will occur in said outlet when liquid is discharged from the pump, and means operable by the variation in pressure in the outlet of the second pump to vary the capacity of the latter from a maximum when air is discharged through the outlet of the second pump to a minimum when only liquid is discharged from the last-named outlet.

7. Liquid dispensing apparatus, comprising, a casing having therein an air separating chamber with an inlet and upper and lower outlets and having also a liquid-recovery chamber with an inlet and upper and lower outlets connected respectively to the atmosphere and to the first-named inlet, a variable-capacity pump having its inlet connected to the upper outlet of the separating chamber and its outlet to the inlet of the liquid-recovery chamber, means responsive to the presence or absence of liquid in the last-named outlet to vary the capacity of said pump from a minimum to a maximum, a discharge conduit for air-free liquid connected to the lower outlet of the separating chamber and extending through the liquid-recovery chamber, a second variable-capacity pump located in the liquid-recovery chamber and interposed in said conduit, a meter also interposed in said conduit, a control valve for the outlet of said conduit, and means responsive to rise and fall of pressure in said conduit caused by closing and opening of the valve to respectively vary the capacity of the last-named pump from a maximum to a minimum and vice versa.

8. Liquid dispensing apparatus, comprising, a casing having therein an air separating chamber with an inlet and upper and lower outlets and having also a liquid-recovery chamber with an inlet and upper and lower outlets connected respectively to the atmosphere and to the first-named inlet, a valve controlling the lower outlet of the separating chamber opening and closing it in response to rise of liquid in said chamber above or fall of liquid to a predetermined level, a variable-capacity pump having its inlet connected to the upper outlet of the separating chamber and its outlet to the inlet of the liquid recovery chamber, means responsive to the presence or absence of liquid in the last-named outlet to vary the capacity of said pump from a minimum to a maximum, a discharge conduit for air-free liquid connected to the lower outlet of the separating chamber and extending through the liquid-recovery chamber, a second variable capacity pump located in the liquid-recovery chamber and interposed in said conduit, a meter also interposed in said conduit, a control valve for the outlet of said conduit, and means responsive to rise and fall of pressure in said conduit caused by closing and opening of the valve to respectively vary the capacity of the last-named pump from a maximum to a minimum and vice versa.

9. Liquid dispensing apparatus, comprising, a casing having therein an air separating chamber with an inlet and upper and lower outlets and having also a liquid-recovery chamber with an inlet and upper and lower outlets connected respectively to the atmosphere and to the first-named inlet, a variable-capacity pump having its inlet connected to the upper outlet of the separating chamber and its outlet to the inlet of the liquid-recovery chamber, means responsive to the presence or absence of liquid in the last-named outlet to vary the capacity of said pump from a minimum to a maximum, a discharge conduit for air-free liquid connected to the lower outlet of the separating chamber and extending through the liquid recovery chamber, a second variable-capacity pump located in the liquid-recovery chamber and interposed in said conduit, a meter also interposed in said conduit and mounted on said casing, a control valve for the outlet of said conduit, and means responsive to rise and fall of pressure in said conduit caused by closing and opening of the valve to respectively vary the capacity of the last-named pump from a maximum to a minimum and vice versa.

10. Liquid dispensing apparatus, comprising, a casing having therein an air separating chamber with an inlet and upper and lower outlets and having also a liquid-recovery chamber with an inlet and upper and lower outlets connected respectively to the atmosphere and to the first-named inlet, a variable-capacity pump mounted on said casing and having its inlet connected to the upper outlet of the separating chamber and its outlet to the inlet of the liquid-recovery chamber, means responsive to the presence or absence of liquid in the last-named outlet to vary the capacity of said pump from a minimum to a maximum, a discharge conduit for air-free liquid connected to the lower outlet of the separating chamber and extending through the liquid-recovery chamber, a second variable-capacity pump located in the liquid-recovery chamber and interposed in said conduit, a meter also interposed in said conduit, a control valve for the outlet of said conduit, and means responsive to rise and fall of pressure in said conduit caused by closing and opening of the valve to respectively vary the capacity of the last-named pump from a maximum to a minimum and vice versa.

11. Liquid dispensing apparatus comprising, a casing having therein an air separating chamber with an inlet and upper and lower outlets and having also a liquid-recovery chamber with an inlet and upper and lower outlets connected respectively to the atmosphere and to the first-named inlet, a variable-capacity pump mounted on said casing and having its inlet connected to the upper outlet of the separating chamber and its outlet to the inlet of the liquid-recovery chamber, means responsive to the presence or absence of liquid in the last-named outlet to vary the capacity of said pump from a minimum to a maximum, a discharge conduit for air-free liquid connected to the lower outlet of the separating chamber and extending through the liquid-recovery chamber, a second variable-capacity pump located in the liquid-recovery chamber and interposed in said conduit, a common drive shaft for both said pumps, a meter also interposed in said conduit, a control valve for the outlet of said conduit, and means responsive to rise and fall of pressure in said conduit caused by closing and opening of the valve to respectively vary the capacity of the last-named pump from a maximum to a minimum and vice versa.

12. Liquid dispensing apparatus, comprising, a casing having therein an air separating chamber with an inlet and upper and lower outlets and having also a liquid-recovery chamber with an inlet and upper and lower outlets connected respectively to the atmosphere and to the first-named inlet, a variable-capacity pump mounted on said casing and having its inlet connected to the upper outlet of the separating chamber and its outlet to the inlet of the liquid-recovery chamber, means responsive to the presence or absence of liquid in the last-named outlet to vary the capacity of said pump from a minimum to a maximum, a discharge conduit for air-free liquid connected to the lower outlet of the separating chamber and extending through the liquid-recovery chamber, a second variable-capacity pump located in the liquid-recovery chamber and interposed in said conduit, a common drive shaft for both said pumps, a motor mounted on said casing and connected to drive said shaft, a meter also interposed in said conduit, a control valve for the outlet of said conduit, and means responsive to rise and fall of pressure in said conduit and caused by closing and opening of the valve to respectively vary the capacity of the last-named pump from a maximum to a minimum and vice versa.

13. In liquid dispensing apparatus, a suction conduit, a discharge conduit terminating with a valved nozzle, a meter interposed in the discharge conduit, an air separator having an inlet connected to said suction conduit and a lower outlet connected to said discharge conduit and having also an upper outlet, a first positively-acting variable-capacity pump interposed in the discharge conduit, a second positively-acting variable-capacity pump having its inlet connected to the upper outlet and having an outlet, means responsive to the presence or absence of liquid in the last-named outlet to vary the pumping rate of the second pump, and means responsive to rise and fall of pressure in the outlet conduit caused by closing or opening of said valve to vary the pumping rate of the first pump.

14. In liquid dispensing apparatus, a suction conduit, a discharge conduit terminating with a valved nozzle, a meter interposed in the discharge conduit, an air separator having an inlet connected to said suction conduit and a lower outlet connected to said discharge conduit and having also an upper outlet, a first positively-acting variable-capacity pump interposed in the discharge conduit, a second positively-acting variable-capacity pump having its inlet connected to the upper outlet and having an outlet, means responsive to the presence or absence of liquid in the last-named outlet to vary the pumping rate of the second pump, means responsive to rise and fall of pressure in the outlet conduit caused by closing or opening of said valve to vary the pumping rate of the first pump, and means for preventing the passage of air through the lower outlet of the separator.

15. Liquid dispensing apparatus, comprising, a chamber having an inlet adapted for connection to a liquid supply tank and two outlets located one near the top and one near the bottom of the chamber, a first variable-capacity pump connected to the upper outlet, a discharge conduit for liquid connected to the lower outlet, a meter and a second pump interposed in said conduit, said second pump being positively-acting and having a member movable to vary its pumping rate, means operable by pressure variations in said conduit for moving said member to vary the pumping rate of the second pump from a minimum when said valve is fully closed to a maximum when said valve is fully opened and vice versa, and means operable to vary the capacity of the first pump from a maximum when it is pumping air or gases to a minimum when only liquid is being pumped.

WARREN H. DE LANCEY.

REFERENCES CITED

The following references are of record in the file of this patent:

UNITED STATES PATENTS

| Number | Name | Date |
| --- | --- | --- |
| 2,150,125 | Nelson | Mar. 7, 1939 |
| 2,246,951 | Peter | June 24, 1941 |